Patented July 6, 1943

2,323,728

UNITED STATES PATENT OFFICE 2,323,728

CATALYST AND THE PREPARATION THEREOF

Robert F. Ruthruff, Chicago, Ill.

No Drawing. Application January 15, 1940, Serial No. 313,898

5 Claims. (Cl. 252—204)

This invention relates to improved catalysts and the preparation thereof. More particularly, this invention relates to improved catalysts for the promotion of hydrocarbon reactions and the preparation thereof. Specifically, this invention relates to catalysts exhibiting improved mechanical stability and improved regeneration characteristics over those used in the prior art and to the preparation thereof.

The use of catalysts to promote various reactions is too well known in the art to merit further discussion. Also, it is well known in the art that catalysts during use are commonly subject to mechanical disintegration. Furthermore, it is well known in the art that catalysts employed in promoting various organic reactions, particularly those used in promoting various hydrocarbon reactions, decline in activity more or less rapidly while on stream, thus necessitating more or less frequent regeneration. Very commonly this regeneration process is the most troublesome and most costly part of the catalytic reaction considered as a whole.

One object of this invention is to provide improved synthetic catalysts and a process for the preparation thereof. A further object of this invention is to provide synthetic catalysts of high mechanical stability and a process for the manufacture thereof. An additional object of this invention is to provide synthetic catalysts that can, after use, be regenerated without impairment of catalytic activity by treatment with air at elevated temperatures and furthermore to provide a process for the preparation thereof. Another object of this invention is to provide improved synthetic catalysts and a process for the preparation thereof, said catalysts comprising an inert central core with a superficial layer of catalytically active material formed thereon. Further objects of this invention will become apparent from the following description.

While the employment of the catalysts of this invention will be described largely in terms of the hydrocarbon conversion process known as catalytic polymerization, wherein olefines, particularly gaseous olefines, are converted into higher boiling hydrocarbons, particularly hydrocarbons in the motor fuel boiling range, and even more exclusively in terms of the hydrocarbon conversion process known as catalytic cracking, wherein higher boiling hydrocarbons are converted into lower boiling hydrocarbons, particularly hydrocarbons in the motor fuel boiling range, it shall be understood that the selection of these two examples for illustrative purposes is a matter of choice only and in no way limits the scope of this invention.

The conversion of higher boiling hydrocarbons into hydrocarbons of lower boiling points by the thermal treatment of the former is so well known in the art that any description of the processes and equipment employed is unnecessary. Because of certain inherent disadvantages of these thermal conversion (cracking) processes, within recent years an increasing amount of attention has been given to the development of catalytic conversion processes for accomplishing the same ends as thermal processes. In these catalytic conversion processes, the higher boiling hydrocarbon charge, usually while in the vaporized state, is contacted at elevated temperatures and (generally) at atmospheric pressure or at but slightly elevated pressure with a catalytic material capable of accelerating the conversion of said higher boiling charge to hydrocarbons of lower boiling points. Suitable catalytic agents for the process comprise such materials as natural clays, acid-treated natural clays, synthetic clay-like materials such as synthetic silica-alumina complexes, synthetic magnesium silicate, and the like. After contacting the higher boiling hydrocarbon charge with the selected catalytic material, the resulting reaction products may be separated by fractionation or otherwise into gas, gasoline, and bottoms, these last having essentially the same boiling range as the original higher boiling hydrocarbon charge.

When a higher boiling hydrocarbon charge is contacted, as briefly described above, with a catalytic material capable of accelerating the conversion of said higher boiling charge to hydrocarbons of lower boiling points, in addition to the gaseous and liquid reaction products already mentioned, a solid reaction product, consisting of carbon or carbonaceous residue, is simultaneously formed. This carbon or carbonaceous residue deposits upon the active surfaces of the catalytic material being employed, gradually blanketing said surfaces, resulting in a decline in catalytic activity. To restore the catalyst to its original activity, the deposited carbon or carbonaceous residue must be removed from the catalytically active surfaces, this usually being accomplished by treating the exhausted catalyst with air or dilute air at elevated temperatures. As those skilled in the art are aware, the procedure and equipment for catalyst regeneration are most complicated and most expensive. This is largely due to the thermal instability of the catalytic materials used in the process. During the regeneration step, unless the reaction is followed very closely and is under absolute control, the catalytic materials will become heated to very high temperatures and their activity will be seriously and permanently impaired. To assure absolute control of the regeneration reaction, extremely complicated and very expensive regenerators have been constructed and used.

Processes for the catalytic conversion of higher boiling hydrocarbons into hydrocarbons of lower boiling point may conveniently be divided into three main classes:

1. Processes in which the catalyst is held in a fixed bed.
2. Processes involving the use of a moving bed of catalyst.
3. Processes in which the catalyst is held suspended in moving gas streams.

Each of these three processes will now be described in some detail.

1. In its simplest form fixed catalyst bed operation involves the passage of the higher boiling hydrocarbon charge, preferably in the vapor phase, and at elevated temperatures and atmospheric or slightly elevated pressure, through a reactor containing a suitable contact agent for accelerating the conversion of the charge to hydrocarbons of lower boiling point. The reaction products produced may be worked up in any way desired. As time on stream increases, the percentage of the charge converted to the desired hydrocarbons of lower boiling points decreases and sooner or later it is necessary to stop temporarily the passage of higher boiling hydrocarbon charge to the reactor and regenerate the contact agent therein by treating with air or dilute air at elevated temperatures, extreme care being taken to insure that the temperature never rises above the level known to be injurious to catalyst activity. After regeneration, the higher boiling hydrocarbon charge is again passed over the catalytic agent until activity declines again. This apparatus and procedure have three evident and major disadvantages: (a) The production of the desired conversion product is not continuous, being interrupted from time to time by a regeneration cycle, (b) the character of the desired conversion product varies continuously during any one cycle, conversion being high with a new or freshly regenerated catalyst and low just prior to the regeneration cycle, and (c) while the conversion reaction is appreciably endothermic and the regeneration reaction is strongly exothermic, both must in turn be run in the same apparatus rather than in two separate pieces of equipment designed respectively and exclusively for conversion and regeneration. The first named major disadvantage is usually eliminated by using two reactors, the conversion reaction taking place in one reactor while the catalytic material in the second reactor is being regenerated, the function of the two reactors being reversed from time to time. It is obvious that this procedure does not eliminate the second and third major disadvantages mentioned.

2. By employing a moving bed of catalyst all three of the major disadvantages noted under (1) above are eliminated. In such a process, the higher boiling hydrocarbon charge, preferably in the vapor phase and at elevated temperatures and atmospheric or slightly elevated pressure, is passed through a reactor containing a moving bed of suitable contact agent, fresh contact material being added to the top of the reactor at the same rate as exhausted material is removed from the bottom. It will be noted that while operating in this manner the production of the conversion product is continuous and, in addition, the character of the conversion product is constant at all times. While the catalyst at the top of the reactor is fresh and that at the bottom is exhausted or nearly so, it will be obvious that this distribution in activity remains constant indefinitely under any given set of operating conditions and accordingly gives a conversion product of constant characteristics. The exhausted catalyst or nearly exhausted catalyst removed from the bottom of the reactor is passed to the top of a regenerator. On passage through this regenerator, carbon and carbonaceous deposits are removed from the catalytically active surfaces by treatment with air or dilute air at elevated temperatures, and the regenerated catalyst is removed from the bottom of the regenerator and passed to the top of the reactor to begin the cycle anew. It is evident that in the apparatus described the reactor and regenerator represent separate elements, each of which has been designed to accomplish one particular task.

3. When employing a powdered catalyst in the conversion of higher boiling hydrocarbons into hydrocarbons of lower boiling points, the catalyst, in finely divided form, is suspended in vaporized higher boiling hydrocarbon charge and the mixture is passed through an elongated conduit in which the desired conversion of higher boiling hydrocarbon charge to hydrocarbons of lower boiling points occurs. Following passage through this conduit, the finely powdered and exhausted or nearly exhausted catalyst is separated from the vaporous reaction products in a cyclone separator or other similar device, and the separated solid, after steaming or other suitable treatment if desired (to remove adsorbed and absorbed hydrocarbons) is then regenerated. The regenerator is very similar to the reactor, consisting of an elongated conduit through which the catalyst is passed at elevated temperatures while suspended in a stream of air or dilute air. Regenerated catalyst leaves the elongated conduit and is separated from the gaseous combustion products in a cyclone separator or similar device, the separated solid then being passed to the reaction conduit to again begin the cycle. It is evident that the powdered catalyst mode of operation provides for continuous operation, for the production of a hydrocarbon reaction product having constant properties throughout a run of any duration under any predetermined set of conditions and for an apparatus in which the reactor and regenerator represent separate elements so that each can be designed to best perform its respective function.

In the catalytic conversion of higher boiling hydrocarbons into hydrocarbons of lower boiling points using the powdered catalyst technique, it has been found that most satisfactory results follow the use of natural clays or acid-treated natural clays as catalysts. This is somewhat surprising in view of the fact that synthetic catalysts are two to three or more times as active as these natural catalysts. In a sense it is the high activity of these synthetic catalysts that precludes their use in powdered catalyst work. Where operating according to the powdered catalyst technique, it is almost essential that the regeneration be done with straight air and without intercoolers if the process is to be economically feasible. When synthetic powdered catalysts are employed, due to the high activity of these, large amounts of coke and carbonaceous residues are deposited on the active surfaces during passage through the reactor conduit. When an attempt is made to regenerate the exhausted powdered synthetic catalysts by removal of the carbon and carbonaceous residues therefrom by contacting with straight air, the temperature rise within each individual particle is so great, because of the large amount of carbon and carbonaceous residues burned, that catalyst activity is permanently and adversely affected. The amount of carbon and carbonaceous residues deposited on synthetic powdered catalyst may be reduced by decreasing the time the suspension of catalyst in vaporized oil remains in the reactor conduit, but when this is done the conversion of higher boiling hydrocarbon charge to hydrocarbons of lower boiling points falls below economic limits. Similarly, the amount of carbon and carbonaceous residues deposited on synthetic powdered catalyst may be decreased, without simultaneously decreasing hydrocarbon oil conversion, by greatly increasing the catalyst-to-oil ratio of the mixture passed through the conduit, but here again the increased expense resulting from handling the increased amounts of catalyst makes the process uneconomic.

By substituting natural clay or acid-treated natural clay for synthetic powdered catalyst, improved results are obtained. The natural or acid-treated natural clay is much less active than the powdered synthetic catalyst. Hence, to obtain a given amount of conversion, the catalyst-to-oil ratio may be unity with synthetic catalysts and two to three with clay catalysts. Accordingly, each clay particle after use contains much less carbon and carbonaceous residue than a synthetic catalyst particle, and it has been found that the deposits may be burned from these clay particles with straight air without an undue temperature rise and hence activity is not impaired. Also, it has been found that burnable deposits may be obtained while still keeping within the economic limits insofar as amount of catalyst handled is concerned.

While improved results follow the use of natural clays or acid-treated natural clays in the conversion of higher boiling hydrocarbons to hydrocarbons of lower boiling points by the powdered catalyst technique, the use of such materials offers several disadvantages. Among these may be mentioned the gradual and continuous decline in activity exhibited by natural clays and acid-treated natural clays when used as conversion agents in comparison to the practically constant activity shown by synthetic catalysts. Another disadvantage resides in the less favorable product distribution shown by the oil conversion products resulting from cracking in the presence of natural clay or acid-treated natural clay in comparison with the product distribution shown by oil conversion products obtained from synthetic catalyst experiments. The conversion products made in the presence of natural clays or acid-treated natural clays show a high gas-to-gasoline ratio and a high carbon-to-gasoline ratio. Conversion products obtained in experiments with synthetic catalysts show much lower gas-to-gasoline and carbon-to-gasoline ratios.

The same reasoning applies with minor variations to the process for the catalytic conversion of higher boiling hydrocarbons to hydrocarbons of lower boiling points when using a fixed catalyst bed or a moving catalyst bed. When synthetic catalysts are employed, the exhausted materials contain so much carbon that the regeneration requires most careful attention and most complicated apparatus to insure that the temperature rise during combustion of the carbon or carbonaceous residues is kept within bounds. When a natural clay or acid-treated natural clay is employed on the other hand, because of the comparatively low activity of such contacts, only a small amount of carbon is deposited upon the active surfaces thereof, so that regeneration is a comparatively simple procedure. Contrasted with this advantage exhibited by natural clays and acid-treated natural clays is the fact that such materials are much less active than synthetic materials, give poorer product distributions than synthetic catalytic agents and also exhibit an appreciable and permanent decline in activity with time on stream.

In the catalytic conversion of higher boiling hydrocarbons to hydrocarbons of lower boiling points, let it be assumed that a certain conversion to gasoline is desired, for example, 20%. When using synthetic catalyst this amount of conversion may be attained under operating conditions readily fixed by experiment. When operating in this manner the used synthetic catalyst is recovered with a certain percentage of carbon thereon, say X%. Now, if a change is made to a natural clay or acid-treated natural clay, it will be found, because of the lower activity of this contact agent, that the catalyst-to-oil ratio will have to be increased perhaps two to three fold in order to attain the desired 20% conversion to gasoline, other operating conditions remaining constant. Assuming that the same carbon yield is obtained with the natural catalyst as with the synthetic, the recovered natural catalyst would contain 0.33X% to 0.50X% carbon thereon. However, as has been mentioned previously, for a given gasoline yield, the natural catalyst gives more carbon than the synthetic, so that the true carbon content may be, for example, 0.4X% to 0.6X%, which, for the purposes of this discussion, may be averaged and called 0.5X%. Accordingly, then, two distinct types of exhausted catalyst particles, one containing X% carbon, the other containing 0.5X% carbon, are obtained from the two catalysts mentioned. When an attempt is made to regenerate these two types of exhausted catalysts by treating them separately with straight air at elevated temperatures, the behavior exhibited by the two is entirely different. During the regeneration process heat is liberated due to the combustion of carbon. This heat is dissipated by two main mechanisms: (a) by heating the air stream by which the catalyst particles are surrounded and (b) by heating the catalyst particles themselves. The synthetic catalyst particles, primarily because of their high activity, contain X% carbon at the start of the regeneration process, and the combustion of this generates so much heat that the catalyst particles are raised to a temperature level above that at which permanent impairment of activity occurs. The natural clay catalyst particles, or the acid-treated natural clay particles, on the other hand, because of the relatively low activity of these, contain only 0.5X% carbon at the start of the regeneration process, and the combustion of this amount of carbon generates insufficient heat to raise the catalyst particles to a temperature level at which permanent impairment of activity occurs. This explanation applies, with certain obvious minor modifications, to all three types of operation previously considered.

As will be obvious to those skilled in the art, it is evident that if each particle of synthetic catalyst is, during regeneration, in intimate heat exchange relationship with one or more particles of a material containing no carbon thereon, the heat rise in the resulting cluster or aggregation would be held within the necessary limits. The essence of this invention lies in providing, in effect, such a cluster or aggregation, one part of which serves as the active conversion catalyst, the other providing a heat reservoir during regeneration to keep the temperature rise within the required limits. Such a modified catalyst comprises an inert core covered by a layer of synthetic catalyst formed thereon. The catalyst particle of this invention may conveniently be compared to a baseball, the hide cover corresponding to the outer layer of catalytically active material, the yarn interior being equivalent to the inert core which serves as a heat reservoir during regeneration.

With such a catalyst, comprising a superficial layer of catalytically active synthetic material formed upon the surface of an inert core, all of the advantages of both synthetic and natural catalysts are combined in one material. When employing acid-treated natural clays in the catalytic cracking of gas oil by the powdered catalyst technique and when using a catalyst-to-gas oil ratio by weight of 10 to 20, more or less, it has been found that the used natural catalyst may be safely regenerated with straight air without temperature control, the heat capacity of the system, due to the catalyst particles and regeneration air, being sufficient to absorb all heat generated by combustion of carbon without giving a dangerous heat rise. However, with these acid-treated natural clays, the product distribution is rather poor and, furthermore, these clays suffer a permanent decline in activity with use. When, on the other hand, a synthetic catalyst is used, to obtain a given amount of conversion the high activity of such materials must be compensated. This may be accomplished, for example, by reducing the catalyst to gas oil weight ratio, say to 3–7, more or less. When this is done the regeneration system does not have sufficient heat capacity to absorb the heat generated by carbon combustion without an excessive temperature rise. In this case resort is usually had to two or more regeneration conduits with intercoolers between to remove excessive heat. This apparatus is cumbersome and expensive but allows the use of synthetic catalysts with their long active life and excellent product distribution.

It is obvious that the catalyst of my invention, comprising a superficial layer of catalytically active synthetic material formed on an inert support, combines the advantages of both the synthetic catalyst and the natural clays or acid-treated natural clays. While the catalytically active portion of my improved catalyst exhibits the high activity, the long life, and the ability to give excellent product distribution of synthetic catalysts, yet a particle of my catalyst, considered as a whole, shows the low activity of clays and acid-treated clays and accordingly requires a high catalyst-to-oil ratio for obtaining reasonable conversions, and as a result, when exhausted, may be regenerated with straight air, taking no precautions to control temperature rise since the high heat capacity of the catalyst-air system and the low amount of carbon burned per pound of catalyst make such precautions unnecessary.

The major operating difficulty in catalytic cracking, that is in processes for the conversion of higher boiling hydrocarbons into hydrocarbons of lower boiling points, particularly into hydrocarbons in the motor fuel boiling range, resides in the regeneration step. On the other hand, in catalytic polymerization, that is in processes for the conversion of lower boiling olefines, particularly gaseous olefines, into higher boiling hydrocarbons, particularly hydrocarbons in the motor fuel boiling range, the major operating difficulty resides in the mechanical instability of the catalyst.

Catalytic polymerization may be conducted using a fixed catalyst bed, a moving catalyst bed, or powdered catalyst, but usually a fixed catalyst bed apparatus is used, two or more beds being available to assure continuity of operation. The charge, usually consisting of gaseous olefines in admixture with the analogous paraffins, is passed at elevated temperature and preferably at moderate to high superatmospheric pressure through one or more reactors containing fixed catalyst beds, another catalyst bed being simultaneously regenerated. The reaction products are separated from unconverted and unconvertible charge by any suitable means, for example, fractionation. This mode of operation gives satisfactory results when applied to catalytic polymerization. By using one reactor or group of reactors for conversion and another reactor or group of reactors for regeneration, continuous operation is attained. Decline in catalytic activity is rather slow. For example, a polymerization catalyst may give economic conversions for periods of one to two weeks or more as compared with from a few minutes to at the most a few hours with cracking catalysts. Accordingly, change in character of product with time on stream is quite slow and even this may be largely eliminated by using two or more reactors simultaneously in conversion, the different reactors containing catalysts of various ages. Because of the long period between regenerations, a long period can be devoted to regenerations, so this part of the process offers no particular difficulties.

In catalytic polymerization the major problem to be overcome is the mechanical instability of the catalysts employed, consisting usually of silica-phosphoric acid complexes. As these materials are used they swell rapidly and disintegrate. The powdery material results in high pressure drops and eventual shutting down of the apparatus. It has been found that catalysts made in accord with the teachings of this invention and consisting of a superficial layer of catalytically active material formed upon the surface of an inert support have high mechanical stability and can be used with marked success in catalytic polymerization reactions.

As has been mentioned previously, the use of the processes of catalytic cracking and catalytic polymerization to illustrate the utility of the present invention is a matter of choice only and in no way limits the scope of said invention.

Now that the general principles of the present invention have been described, the invention will be further illustrated by the use of certain specific examples relating to the preparation of suitable catalysts therefor. It is to be understood that these examples are illustrative only and in no way limit the scope of the instant invention.

The improved catalysts of the instant invention comprise a superficial layer of catalytically active material formed upon the surface of an inert support. Experimentation has shown that best results are obtained if the inert support is siliceous in nature and has also demonstrated that a superficial layer of catalytically active material may best be formed by first forming a superficial layer of alkali metal silicates upon the surface of an inert siliceous support followed by the conversion of said superficial layer of alkali metal silicates into a superficial layer of catalytically active material. Accordingly, in the following examples, those designated A describe the process for forming a superficial layer of alkali metal silicates upon the surface of an inert siliceous support while those designated B describe the process for converting said superficial layer of alkali metal silicates into a superficial layer of catalytically active material.

*Example 1A.*—Rather large particles of siliceous matter, for example, 4 to 20 mesh crushed quartz, sand, quartzite, or the like, are wet with a dilute solution of sodium carbonate, following which excess solution is removed from the siliceous material, which is then drained and allowed to dry. By this means each particle of the siliceous material is coated with a thin layer of soda ash. The treated siliceous material that results is then processed in a manner similar to that employed in the well known procedure for the manufacture of sodium silicates; that is, it is brought to a temperature of 1250–1450° C. in a suitable furnace whereby reaction occurs with the production of a glaze of sodium silicates on the surface of each siliceous particle. By proper control of the strength of the sodium carbonate treating solution, it is possible to vary over rather wide limits the amount of sodium carbonate deposited on the individual particle and in turn regulate the amount, and hence the thickness, of the resulting glaze of sodium silicates. In general, conditions are so regulated that from 5 to 25% of an average particle is converted to sodium silicates; that is, after treatment, the average particle consists of a core containing from 75 to 95% of the original siliceous material surrounded by a surface glaze which contains from 5 to 25% of the original siliceous material in the form of sodium silicates. Some variations in the percentage of silica reacting are permitted; for example, the surface glaze may contain from 1 to 50% of the original siliceous material in the form of sodium silicates, but it has been found that if too much is converted a large part of the resulting reaction products or their decomposition products falls from the particles in subsequent processing. Also, if too much siliceous material is converted, an almost homogeneous melt is obtained in the heating process, which defeats the objects of the invention. Following the heating, the resulting reaction mixture may be cooled if desired and lightly crushed if necessary before proceeding in accord with examples of the B series.

By the above process siliceous particles are obtained bearing a superficial but autogeneous glaze of sodium silicates. The process of the instant example is especially suited for use when rather large siliceous particles are treated, for example, particles convertible into catalysts of the proper mesh size for use in fixed bed or moving bed operations. If an attempt is made to apply too thick a glaze, especially when fine siliceous particles are used, a fused mass results which cannot be utilized further for the purposes of this invention. A process suitable for use when converting finely divided siliceous materials to catalysts will be found in Example 2A below. Even when relatively large particles are used in the instant example, more or less fusing together is noticed at times, but this is easily corrected by crushing lightly or dumping the material while still quite hot into water or a solution to be used in further processing.

Agents other than sodium carbonate may be used, for example, sodium hydroxide. This material, although much more expensive than soda ash, allows the reaction to be carried out at much lower temperatures. A mixture of sodium sulfate with carbon or other reducing agent may be substituted for sodium carbonate. For example, the silica particles may be dipped in a heavy petroleum fraction and then dusted with sodium sulfate prior to heat treatment. This last process is not particularly satisfactory, for if too much carbon or its equivalent is used the superficial layer is dark colored, and if too little is used the superficial layer contains sodium sulfate. These two difficulties can be overcome by covering the silica particles with sodium sulfate alone and then heat-treating them in a reducing atmosphere, for example, an atmosphere of hydrocarbon gas or carbon monoxide. This variation will be explained in greater detail in the next example, which is

*Example 2A.*—Finely divided siliceous material, for example, finely pulverized quartz, fine sand, diatomaceous earth, or the like, is treated with a solution of sodium sulfate, following which excess solution is removed from the finely divided siliceous material, which is then drained and allowed to dry. By this means each particle of the siliceous material is coated with a thin layer of sodium sulfate. The resulting particles are suspended in a gaseous medium having a reducing action, and the whole is passed through an elongated conduit where the suspension is maintained at a sufficient temperature, say 1250–1450°, for reaction to occur. The reaction products, preferably after cooling somewhat, are separated in a cyclone separator or similar device to give siliceous particles covered with a superficial layer of sodium silicate. Suitable gaseous media for use in this process include carbon monoxide and gaseous hydrocarbons. A particularly suitable gaseous medium consists of the combustion products formed by burning natural gas in a deficiency of air or oxygen. Such a gas mixture has a reducing action and automatically is at high temperature. Water gas, producer gas, and the like may be employed.

For further details regarding the formation of a superficial layer of alkali metal silicates upon the surface of an inert siliceous support in conformity with Example 2A, reference may be had to my copending application, Serial Number 313,899, filed January 15, 1940.

It is obvious that the method described in this example is especially suitable for the treatment of finely divided siliceous materials, while that described in Example 1A is more directed towards the processing of siliceous materials of larger particle sizes. The general principles outlined under Example 1A also apply to the instant example, certain obvious changes being made. For example, the thickness of the glaze of sodium silicates may be regulated by varying the strength of the sodium sulfate coating solution. However, it should be noted that by the procedure of the instant example a greater proportion of each siliceous particle may be converted to sodium silicates and smaller siliceous particles may be treated without forming a melt. In fact, it is obvious that if desired, by the procedure of the instant example, it is possible to convert finely divided siliceous materials completely to finely divided individual particles of sodium silicate. It hardly need be mentioned that the instant example is particularly directed to the preparation of materials for eventual conversion into catalysts in accord with the teachings of this invention suitable for use in powdered catalyst operations.

In the instant example, coating agents other than sodium sulfate, for example, sodium carbonate, sodium hydroxide, or sodium sulfate plus carbon or other reducing agent, may be employed. When these materials are used, it is not necessary to employ gaseous media having a reducing action.

Many other variations, applicable to either Example 1A or 2A or both, will occur to those skilled in the art. For example, the inert siliceous particles may be covered with the alkali metal compound by any convenient method. One such method, especially applicable when finely divided siliceous materials are being treated, consists in charging a slurry of finely divided siliceous material in a solution of sodium hydroxide, carbonate, sulfate, or the like to a reservoir containing kerosene, gas oil, or a similar petroleum fraction in a highly heated condition. Flash evaporation occurs, steam and vaporized hydrocarbon passing overhead and a slurry of coated, finely divided siliceous material in hydrocarbon liquid being removed as bottoms. The coated finely divided siliceous material is separated from the hydrocarbon liquid and is passed to the elongated conduit for reaction as described in Example 2A. Or the slurry of finely divided siliceous material in a solution of sodium carbonate, sodium hydroxide, sodium sulfate, or the like may be atomized directly into the elongated reaction conduit of Example 2A, where it is picked up by the heated gas stream flowing therethrough, is dried instantaneously, following which reaction occurs as previously described.

It is not essential that the inert siliceous particles be covered by a glaze of alkali metal silicates; alkaline earth metal silicates can also be employed. If desired, superficial layers of alkaline earth metal silicates may be formed upon the surface of an inert siliceous support in the wet way, for example, by subjecting siliceous particles to hydrothermal reaction, preferably at superatmospheric pressures and the elevated temperatures corresponding thereto, with a solution of calcium hydroxide or basic magnesium carbonate for example. The rate of reaction may be greatly accelerated by adding a small amount of alkali metal hydroxide to the slurry being reacted.

Having explained processes whereby a superficial glaze of sodium silicates may be formed on the surfaces of siliceous materials, attention will now be directed to methods for converting said superficial glazes into superficial layers of catalytically active materials.

*Example 1B.*—Particles of an inert siliceous support bearing a superficial layer of sodium silicates thereon, formed in accord with Example 1A or 2A or otherwise, are treated with a solution of a magnesium compound to convert said superficial layer of sodium silicates into a superficial layer of catalytically active silica magnesia complex. This conversion may be accelerated by heating; if desired the reaction may be conducted in an autoclave and at superatmospheric pressures and at temperatures above the normal boiling point of the magnesium compound solution used. Following this reaction, the resulting particles are thoroughly washed, it being important that all or practically all of the sodium salts are removed. The resulting particles are then dried to form a catalyst comprising a superficial layer of catalytically active silica magnesia complex on an inert siliceous support, said catalytic agent being especially valuable in catalytic polymerization and catalytic cracking.

*Example 2B.*—Particles of an inert siliceous support bearing a superficial layer of sodium silicates, formed thereon in accord with Examples 1A, 2A or otherwise, are treated with a solution of a calcium compound to convert said superficial layer of sodium silicates into a superficial layer of calcium silicates. The conversion may be accelerated by heating; if desired the reaction may be conducted in an autoclave and at superatmospheric pressures and at temperatures above the normal boiling point of the calcium compound solution used. Following this reaction, the resulting particles are thoroughly washed, it being important that all or practically all of the sodium salts are removed. The washed particles are then brought in contact with a solution of a magnesium compound to convert the superficial layer of calcium silicates to a superficial layer of catalytically active magnesia-silica complex. This conversion may be accelerated by heating; if desired the reaction may be conducted in an autoclave and at superatmospheric pressures and at temperatures above the normal boiling point of the magnesium compound solution used. After washing, the particles are dried to form a catalyst comprising a superficial layer of catalytically active silica-magnesia complex on an inert siliceous support, said catalyst being especially valuable in catalytic polymerization and catalytic cracking.

*Example 3B.*—Particles of an inert siliceous support bearing a superficial layer of sodium silicates thereon formed in accord with Example 1A or 2A or otherwise are treated with dilute mineral acid, for example, 6N sulfuric or hydrochloric acid, to decompose the glaze of sodium silicates with the formation of a hydrous silicate layer. The process may be accelerated by employing acids in the heated condition; if desired the reaction may be conducted in an autoclave at superatmospheric pressures and at temperatures above the normal boiling point of the dilute acids employed. Following this decomposition reaction, the resulting particles are thoroughly washed, it being especially important that all or practically all the sodium salts are removed. The washed particles are brought in contact with a solution of a magnesium compound to convert the superficial layer of hydrous silica into a catalytically active superficial layer of magnesia-silica complex. This conversion may be accelerated by heating; if desired the reaction may be conducted in an autoclave at superatmospheric pressures and at temperatures above the normal boiling point of the magnesium compound solution used. After washing, the particles are dried to form a catalyst comprising a superficial layer of catalytically active silica-magnesia complex on an inert siliceous support, said catalyst being especially valuable in catalytic polymerization and catalytic cracking.

In all of the above examples it is preferable to convert the superficial layer of sodium silicates into a superficial layer of catalytically active material in an acid medium. Obviously this occurs in the formation of hydrous silica in Example 3B. In treating the superficial layer of sodium silicates with solutions of a magnesium compound (Example 1B), or a calcium compound (Example 2B), the medium is usually acid; if not, it is preferable to make it so by adding a small amount of an appropriate acid. The same applies to the treatment of the superficial layer of calcium silicates with a solution of a magnesium compound (Example 2B) and to the treatment of a superficial layer of hydrous silica with a magnesium compound (Example 3B). It should be mentioned that the superficial layers of hydrous silica formed as described in Examle 3B may, if desired, be used as catalysts in certain reactions.

It is not necessary to employ an inert siliceous support bearing a superficial layer of alkali metal silicates as described in the above examples. If desired, an inert siliceous support with a superficial layer of alkaline earth silicates, for example, calcium silicates, may be used instead, except of course in Example 2B.

In all of the examples, the use of a pure or substantially pure siliceous base is specified, but this is not necessary. Various silicates, for example, calcium silicate, may be used as an inert siliceous support. For example, highly active catalysts may be made by subjecting calcium silicate, either natural or synthetic, to hydrothermal reaction with a solution of a magnesium compound for the time necessary to give a superficial layer of magnesium silicate upon the calcium silicate base.

As will be evident to those skilled in the art, many modifications and variations of the instant invention may be made without departing from the spirit and scope thereof, and accordingly it is intended that this invention shall be subject only to such limitations as are contained in the accompanying claims.

I claim:

1. In a process for producing catalysts, the step comprising forming a superficial layer of catalytically active magnesia-silica complex upon the surface of inert siliceous particles.

2. In a process for producing catalysts, the steps comprising forming a superficial layer of alkali metal silicates upon the surface of inert siliceous particles and converting said superficial layer of alkali metal silicates into a superficial layer of catalytically active magnesia-silica complex.

3. In a process for producing catalysts, the steps comprising forming a superficial layer of alkali metal silicates upon the surface of inert siliceous particles, converting said superficial layer of alkali metal silicates into a superficial layer of hydrous silica, and converting the resulting superficial layer of hydrous silica into a superficial layer of catalytically active magnesia-silica complex.

4. A catalyst comprising inert siliceous particles bearing a superficial layer of catalytically active silica-magnesia complex which has been formed thereon.

5. In a process for producing catalysts, the steps comprising forming a superficial layer of alkali metal silicates upon the surface of inert siliceous particles, converting said superficial layer of alkali metal silicates into a superficial layer of alkaline earth metal silicates and converting the resulting superficial layer of alkaline earth metal silicates into a superficial layer of catalytically active magnesia-silica complex.

ROBERT F. RUTHRUFF.